(12) United States Patent
Sintorn et al.

(10) Patent No.: US 10,609,108 B2
(45) Date of Patent: Mar. 31, 2020

(54) NETWORK RECOMMENDED BUFFER MANAGEMENT OF A SERVICE APPLICATION IN A RADIO DEVICE

(71) Applicant: Telefonaktiebolaget LM Ericsson (publ), Stockholm (SE)

(72) Inventors: Mathias Sintorn, Sollentuna (SE); Eric Andersson, Järfälla (SE); Ann-Christine Eriksson, Enköping (SE); Lotta Voigt, Bromma (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 170 days.

(21) Appl. No.: 15/570,159

(22) PCT Filed: May 8, 2015

(86) PCT No.: PCT/SE2015/050519
§ 371 (c)(1),
(2) Date: Oct. 27, 2017

(87) PCT Pub. No.: WO2016/182482
PCT Pub. Date: Nov. 17, 2016

(65) Prior Publication Data
US 2018/0139261 A1  May 17, 2018

(51) Int. Cl.
H04L 29/06 (2006.01)
H04L 29/08 (2006.01)
H04W 48/18 (2009.01)

(52) U.S. Cl.
CPC .......... H04L 65/80 (2013.01); H04L 65/1083 (2013.01); H04L 65/602 (2013.01);
(Continued)

(58) Field of Classification Search
CPC ....... H04L 65/608; H04L 65/80; H04L 67/02; H04L 65/602; H04L 65/1083; H04W 48/18
See application file for complete search history.

(56) References Cited

U.S. PATENT DOCUMENTS

| 8,832,297 B2* | 9/2014 | Soroushian ......... H04L 65/4084 709/231 |
| 9,100,460 B2* | 8/2015 | Eguchi ................. H04L 65/605 |

(Continued)

FOREIGN PATENT DOCUMENTS

| EP | 2403290 A1 | 1/2012 |
| JP | 2003061149 A | 2/2003 |

(Continued)

OTHER PUBLICATIONS

International Search Report and Written Opinion for Application No. PCT/SE2015/050519, dated Feb. 2, 2016, 11 pages.
(Continued)

Primary Examiner — Patrice L Winder
(74) Attorney, Agent, or Firm — NDWE LLP

(57) ABSTRACT

A method performed in a communication network, in which the method comprises obtaining a prediction of future available bandwidth of a radio carrier for a service application in a radio device connected to the network. The method also comprises receiving information about a status of an application buffer of the service application. The method also comprises, based on the obtained prediction and on the received buffer information, preparing a recommendation to the service application for when to fill up an application buffer of the service application. The method also comprises initiating sending of a recommendation message comprising the prepared recommendation to the radio device.

11 Claims, 4 Drawing Sheets

(52) U.S. Cl.
CPC ............ *H04L 65/608* (2013.01); *H04L 67/02* (2013.01); *H04W 48/18* (2013.01)

(56) References Cited

U.S. PATENT DOCUMENTS

| | | | |
|---|---|---|---|
| 9,736,651 B2* | 8/2017 | Chen | H04W 4/029 |
| 9,756,112 B2* | 9/2017 | Jana | H04L 67/02 |
| 9,854,282 B2* | 12/2017 | Grinshpun | H04N 21/23805 |
| 2003/0036824 A1 | 2/2003 | Kuroda et al. | |
| 2006/0109856 A1 | 5/2006 | Deshpande | |
| 2006/0209856 A1 | 9/2006 | Tojo et al. | |
| 2008/0107173 A1 | 5/2008 | van Beek | |
| 2012/0009890 A1 | 1/2012 | Curcio et al. | |
| 2012/0324123 A1 | 12/2012 | Fox et al. | |
| 2013/0227158 A1* | 8/2013 | Miller | H04L 65/60 709/231 |
| 2014/0108495 A1* | 4/2014 | Benno | H04N 21/23406 709/203 |
| 2014/0229570 A1* | 8/2014 | Westberg | H04L 65/605 709/217 |
| 2014/0282792 A1* | 9/2014 | Bao | H04N 21/44004 725/116 |
| 2014/0317234 A1* | 10/2014 | Mueller | H04L 47/10 709/217 |
| 2014/0372569 A1* | 12/2014 | Bouazizi | H04L 67/02 709/219 |
| 2015/0032899 A1* | 1/2015 | Willars | H04L 65/4076 709/231 |
| 2017/0006081 A1* | 1/2017 | Grandl | H04L 67/26 |

FOREIGN PATENT DOCUMENTS

| | | |
|---|---|---|
| JP | 2004282456 A | 10/2004 |
| JP | 2006179986 A | 7/2006 |
| JP | 2013509040 A | 3/2013 |
| KR | 20060103895 A | 10/2006 |
| KR | 20080032088 A | 4/2008 |
| WO | 2010066855 A1 | 6/2010 |
| WO | 2011047335 A1 | 4/2011 |
| WO | 2012118414 A1 | 9/2012 |

OTHER PUBLICATIONS

Communication pursuant to Rule 94(3) EPC for Application No. 15724394.0, dated Jun. 21, 2019, 6 pages.
Decision to Grant a Patent from foreign counterpart Japanese Patent Application No. 2017-558401, dated Jul. 23, 2019, 5 pages.
International Preliminary Report on Patentability for Application No. PCT/SE2015/050519, dated Nov. 23, 2017, 9 pages.
Notice of Reasons for Refusal from foreign counterpart Japanese Patent Application No. 2017-558401, dated May 14, 2019, 4 pages.
Notice of Reasons for Rejection from foreign counterpart Japanese Patent Application No. 2017-558401, dated Dec. 4, 2018, 5 pages.
Notification of Reason for Refusal from foreign counterpart Korean Patent Application No. 10-2017-7033498, dated Dec. 14, 2018, 15 pages.
Notification of Reason for Refusal from foreign counterpart Korean Patent Application No. 10-2017-7033498, dated Jul. 31, 2019, 10 pages.

* cited by examiner

NETWORK RECOMMENDED BUFFER MANAGEMENT OF A SERVICE APPLICATION IN A RADIO DEVICE

CROSS-REFERENCE TO RELATED APPLICATIONS

This application is a National stage of International Application No. PCT/SE2015/050519, filed May 8, 2015, which is hereby incorporated by reference.

TECHNICAL FIELD

The present disclosure relates to methods and devices for buffer management of a service application in a radio device.

BACKGROUND

Content adaptation is a method to transform the content of a media service according to device and network capabilities. It is especially useful in mobile networks and with mobile devices since the network capabilities varies in different technologies, but also in different locations and time. For example, a user moving in a mobile network will experience different throughput due to change in coverage and change in traffic load, and the traffic load in the network will vary over time.

Examples of media are video, audio and pictures, and the adaptation actions are to transform the media rate of video and audio, and the resolution of pictures.

Adaptive Bit Rate (ABR) streaming is a technique used for streaming media. Today's adaptive streaming techniques are mostly based on Hypertext Transfer Protocol (HTTP). The principle is to encode the media into multiple bit rates, and then to segment each of the encoded media files into smaller chunks. The client is made aware of the available media rates and segment lengths. When streaming the media, the client selects a media rate for each segment that is suitable according to the experienced throughput in the network, and adapts to the changes of throughput. Typically, the client starts to download the first one or few segments at the lowest media rate. If the download bit rate is higher than the media bit rate the client will download the next segment selecting a higher media rate, and so on. Later, if the download bit rate has decreased below the media bit rate, the client will download segments selecting a lower media rate.

Dynamic Adaptive Streaming over HTTP (DASH), also known as Moving Picture Experts Group (MPEG)-DASH is the only HTTP-based adaptive bit rate streaming solution that is an international standard. There are also other HTTP-based adaptive bit rate streaming solutions such as HTTP Live Streaming (HLS).

It is known to provide methods for estimating throughput as described in e.g. WO 2012/118414 and WO 2010/066855.

Today, content adaptation is based on measurements from the download of previous segments as seen from the client in the device, e.g., a User Equipment (UE), which may differ from the current status and the status in the near future in the network. Therefore the decisions taken in the client on content adaptation tend to be more reactive than proactive. In a mobile environment the conditions changes very rapidly, e.g. the UE may change location resulting in a change in radio link quality and throughput. The number of users sharing the same radio resources may decrease or increase also resulting in a change of available throughput for the UE.

Also, a UE fills up the application buffer of a service application for the service based on the buffer status, regardless of the available bandwidth.

SUMMARY

It is an objective of the present disclosure to improve the buffer management of an application buffer of a service application, especially for providing a media service. In accordance with the present disclosure, the network obtains information about a predicted future bandwidth which will be available for the service application as well as about the status of the application buffer, and prepares a recommendation to the service application on how to manage the application buffer, specifically when (in time) to download media segments to the media buffer. The radio device, typically the service application therein, may then consider the recommendation when managing the application buffer.

According to an aspect of the present disclosure, there is provided a method performed in a communication network. The method comprises obtaining a prediction of future available bandwidth of a radio carrier for a service application in a radio device connected to said network. The method also comprises receiving information about a status of an application buffer of the service application. The method also comprises, based on the obtained prediction and on the received buffer information, preparing a recommendation to the service application for when to fill up an application buffer of the service application. The method also comprises initiating sending of a recommendation message comprising the prepared recommendation to the radio device.

According to another aspect of the present disclosure, there is provided a computer program product comprising computer-executable components for causing a node of the communication network to perform an embodiment of the method performed in the communication network of the present disclosure when the computer-executable components are run on processor circuitry comprised in the node.

According to another aspect of the present disclosure, there is provided a node for a communication network. The node comprises processor circuitry, and a storage unit storing instructions executable by said processor circuitry whereby said node is operative to obtain a prediction of future available bandwidth of a radio carrier for a service application in a radio device connected to said network. The node is also operative to receive information about a status of an application buffer of the service application. The node is also operative to, based on the obtained prediction and on the received buffer information, prepare a recommendation to the service application for when to fill up an application buffer of the service application. The node is also operative to initiate sending of a recommendation message comprising the prepared recommendation to the radio device.

According to another aspect of the present disclosure, there is provided a method performed in a radio device connected to a communication network. The method comprises running a service application having an application buffer. The method also comprises sending information about a status of the application buffer to the communication network. The method also comprises receiving, from the communication network, a recommendation message comprising a recommendation for when to fill up the application buffer. The method also comprises determining, based on the received recommendation, a time period during which it will fill up the application buffer. The method also comprises sending a request to a service provider of the service application for downloading data to the application buffer during the determined time period.

According to another aspect of the present disclosure, there is provided a computer program product comprising computer-executable components for causing a radio device of a communication network to perform an embodiment of the method performed in a radio device of the present disclosure when the computer-executable components are run on processor circuitry comprised in the radio device.

According to another aspect of the present disclosure, there is provided a radio device for communication via a communication network. The radio device comprises processor circuitry, and a storage unit storing instructions executable by said processor circuitry whereby said radio device is operative to run a service application having an application buffer. The radio device is also operative to send information about a status of the application buffer to the communication network. The radio device is also operative to receive, from the communication network, a recommendation message comprising a recommendation for when to fill up the application buffer. The radio device is also operative to determine, based on the received recommendation, a time period during which it will fill up the application buffer. The radio device is also operative to send a request to a service provider of the service application for downloading data to the application buffer during the determined time period.

According to another aspect of the present disclosure, there is provided a computer program comprising computer program code which is able to, when run on processor circuitry of a node of a communication network, cause the node to obtain a prediction of future available bandwidth of a radio carrier for a service application in a radio device connected to said network. The code is also able to cause the node to receive information about a status of an application buffer of the service application. The code is also able to cause the node to, based on the obtained prediction and on the received buffer information, prepare a recommendation to the service application for when to fill up its application buffer. The code is also able to cause the node to initiate sending a recommendation message comprising the prepared recommendation to the radio device.

According to another aspect of the present disclosure, there is provided a computer program comprising computer program code which is able to, when run on processor circuitry of a radio device, cause the radio device to run a service application having an application buffer. The code is also able to cause the radio device to send information about a status of the application buffer to the communication network. The code is also able to cause the radio device to receive, from the communication network, a recommendation message comprising a recommendation for when to fill up the application buffer. The code is also able to cause the radio device to determine, based on the received recommendation, a time period during which it will fill up the application buffer. The code is also able to cause the radio device to send a request to a service provider of the service application for downloading data to the application buffer during the determined time period.

According to another aspect of the present disclosure, there is provided a computer program product comprising an embodiment of a computer program of the present disclosure and a computer readable means on which the computer program is stored.

It is an advantage of the present disclosure, that the network can recommend the radio device, or rather the service application in the radio device, when to download data to the application buffer. Thus, the network resources may be more efficiently utilized since the service application may chose to download data to its buffer when there are plenty of resources (bandwidth) available, when the download is easier and faster, and chose not to download when the available resources are limited.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
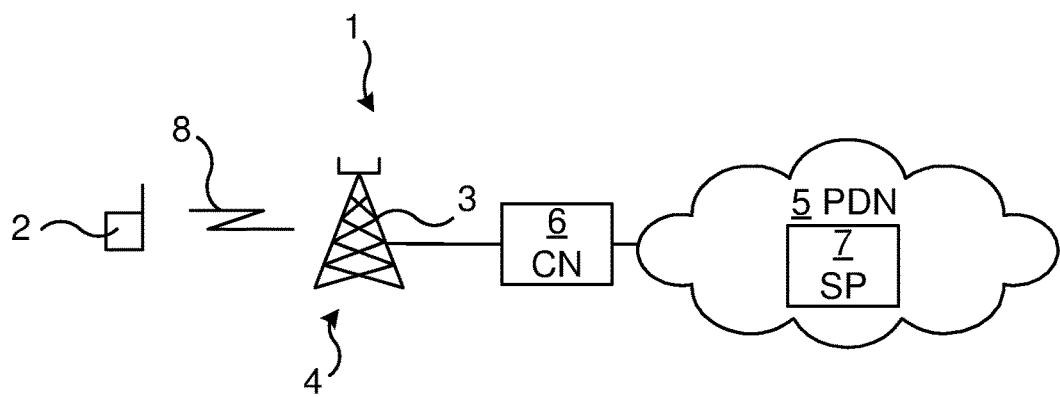
FIG. 1 is a schematic diagram of an embodiment of a radio device connected to a communication network in accordance with the present disclosure.

FIG. 1 illustrates a radio device 2 connected to a service provider 7 via a communication network 1. The communication network may comprise any type of radio communication network such as a Wireless Local Area Network (WLAN) or a cellular network, e.g., a cellular network in accordance with a Third Generation Partnership Project (3GPP) communication standard. In the figure, the communication network 1 is a 3GPP network comprising a cellular Radio Access Network (RAN) 4 comprising at least one base station 3, for instance a Node B of a Wideband Code Division Multiple Access (WCDMA) communication standard or an evolved Node B (eNB) of a Long Term Evolution (LTE) communication standard. The communication network 1 also comprises a core network (CN) 6 via which access to a Packet Data Network (PDN) 5, e.g. the Internet, is offered. The radio device 2 is connected to the communication network 1 and thus has access to the PDN 5 via the network 1. The radio device 2 may be any device or UE, mobile or stationary, enabled to communicate over a radio channel in a communication network, for instance but not limited to e.g. mobile phone, smartphone, modem, sensors, meters, vehicles (e.g. a car), household appliances, medical appliances, media players, cameras, or any type of consumer electronic, for instance but not limited to television, radio, lighting arrangements, tablet computer, laptop, or personal computer (PC). In accordance with the present disclosure, the radio device 2 runs a service application, i.e. it executes application software to form the service application. The service (for instance media streaming) which is presented by the service application is provided via the PDN 5 by a server of a service provider (SP) 7.

Figure 2A:
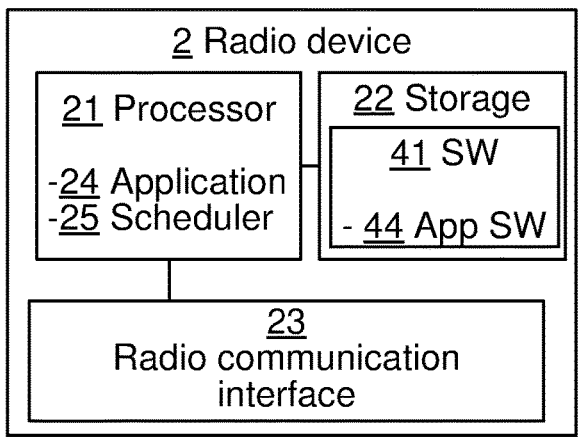
FIG. 2 is a schematic block diagram of an embodiment of a radio device of the present disclosure.

FIG. 2a schematically illustrates an embodiment of a radio device 2 of the present disclosure. The radio device 2 comprises processor circuitry 21 e.g. a central processing unit (CPU). The processor circuitry 21 may comprise one or a plurality of processing units in the form of microprocessor(s). However, other suitable devices with computing capabilities could be comprised in the processor circuitry 21, e.g. an application specific integrated circuit (ASIC), a field programmable gate array (FPGA) or a complex programmable logic device (CPLD). The processor circuitry 21 is configured to run one or several computer program(s) or software (SW) 41 (see also FIG. 4) stored in a storage 22 of one or several storage unit(s) e.g. a memory. The SW 41 comprises application (App) SW 44 which, when executed by the processor circuitry forms the service application 24. Other computer program(s) comprised in the SW 41 may form e.g. the scheduler 25 scheduling downloading of data to the application buffer of the service application 24. The scheduler 25 may be part of the service application 24, or be separate therefrom. The storage unit 22 is regarded as a computer readable means 42 (see FIG. 4) as discussed herein and may e.g. be in the form of a Random Access Memory (RAM), a Flash memory or other solid state memory, or a hard disk, or be a combination thereof. The processor circuitry 21 may also be configured to store data in the storage 22, as needed. The radio device 2 also comprises a radio communication interface 23, typically comprising a transceiver and an antenna, for enabling radio communication with/via the communication network 1, e.g. for downloading data from the SP 7.

Thus, according to an aspect of the present disclosure, there is provided a radio device 2 for communication via a communication network 1. The radio device comprises processor circuitry 21, and a storage unit 22 storing instructions 41 executable by said processor circuitry whereby said radio device is operative to run a service application 24 having an application buffer. The radio device is also operative to send information about a status of the application buffer to the communication network. The radio device is also operative to receive, from the communication network, a recommendation message comprising a recommendation for when to fill up the application buffer. The radio device is also operative to determine, based on the received recommendation, a time period during which it will fill up the application buffer. The radio device is also operative to send a request to a service provider 7 of the service application for downloading data to the application buffer during the determined time period.

Figure 2B:
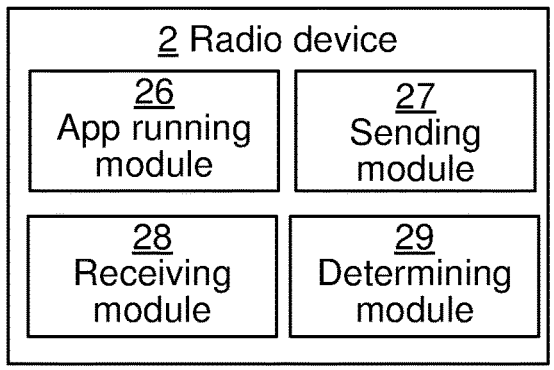

FIG. 2b is a schematic block diagram functionally illustrating an embodiment of the radio device 2 in FIG. 2a. As previously mentioned, the processor circuitry 21 may run software 41 for enabling the radio device to perform an embodiment of a method of the present disclosure, whereby functional modules may be formed in radio device 2 e.g. in the processor circuitry 21 for performing the different steps of the method. These modules are schematically illustrated as blocks within the radio device 2. Thus, the radio device 2 comprises an application running module 26 for running the service application 24, a sending module 27 for sending information about the application buffer status as well as for sending the request to the service provider 7, a receiving module 28 for receiving the recommendation message, and a determining module 29 (e.g. comprising the scheduler 25) for determining the time period during which the radio device 2 (specifically the service application 24) will fill up the application buffer.

Figure 3A:
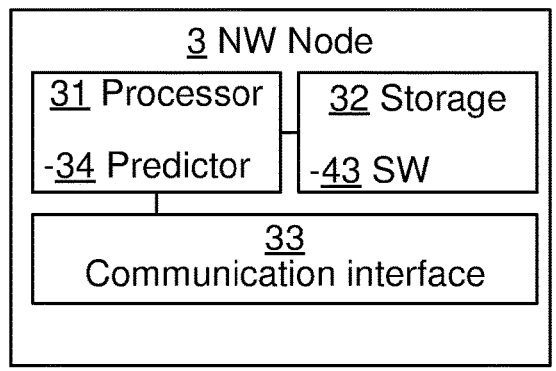
FIG. 3 is a schematic block diagram of an embodiment of a network node of the present disclosure.

FIG. 3a schematically illustrates an embodiment of a network node 3 of the present disclosure. The NW node 3 may be any node in the communication network 1, but may in some embodiments preferably be a RAN node such as a base station 3. The network node 3 comprises processor circuitry 31 e.g. a central processing unit (CPU). The processor circuitry 31 may comprise one or a plurality of processing units in the form of microprocessor(s). However, other suitable devices with computing capabilities could be comprised in the processor circuitry 31, e.g. an application specific integrated circuit (ASIC), a field programmable gate array (FPGA) or a complex programmable logic device (CPLD). The processor circuitry 31 is configured to run one or several computer program(s) or software (SW) 43 (see also FIG. 4) stored in a storage 32 of one or several storage unit(s) e.g. a memory. The SW 43 may for instance comprise software which, when executed by the processor circuitry forms a predictor 34 for predicting the future available bandwidth to the service application 24 as discussed herein. The storage unit 32 is regarded as a computer readable means 42 (see FIG. 4) as discussed herein and may e.g. be in the form of a Random Access Memory (RAM), a Flash memory or other solid state memory, or a hard disk, or be a combination thereof. The processor circuitry 31 may also be configured to store data in the storage 32, as needed. The NW node 3 also comprises a communication interface 33 e.g. including a radio communication interface, typically comprising a transceiver and an antenna, for enabling radio communication with the radio device 2, e.g. for forwarding data from the SP 7.

Thus, according to an aspect of the present disclosure, there is provided a node 3 for a communication network 1. The node comprises processor circuitry 31, and a storage unit 32 storing instructions executable by said processor circuitry whereby said node is operative to obtain a prediction of future available bandwidth of a radio carrier 8 for a service application 24 in a radio device 2 connected to said network. The node is also operative to receive information about a status of an application buffer of the service application. The node is also operative to, based on the obtained prediction and on the received buffer information, prepare a recommendation to the service application for when to fill up an application buffer of the service application. The node is also operative to initiate sending of a recommendation message comprising the prepared recommendation to the radio device.

Figure 3B:
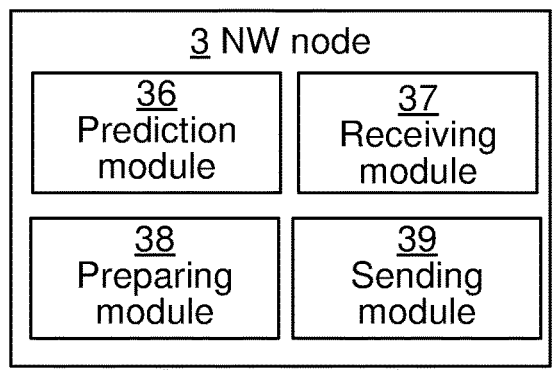

FIG. 3b is a schematic block diagram functionally illustrating an embodiment of the NW node 3 in FIG. 3a. As previously mentioned, the processor circuitry 31 may run software 43 for enabling the node to perform an embodiment of a method of the present disclosure, whereby functional modules may be formed in node 3 e.g. in the processor circuitry 31 for performing the different steps of the method. These modules are schematically illustrated as blocks within the node 3. Thus, the NW node 3 comprises a prediction module 36 (e.g. comprising the predictor 34) for obtaining the prediction of future available bandwidth, a receiving module 37 for receiving the application buffer status information, a preparing module 38 for preparing the recommendation, and a sending module 39 for initiating sending of the recommendation message.

Figure 4:
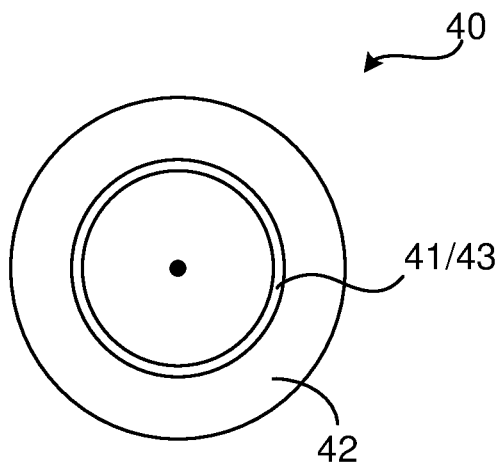
FIG. 4 is a schematic illustration of an embodiment of a computer program product of the present disclosure.

FIG. 4 illustrates a computer program product 40. The computer program product 40 comprises a computer readable (e.g. non-volatile or non-transitory) means/medium 42 comprising a computer program 41/43 in the form of computer-executable components 41/43. The computer program/computer-executable components may be configured to cause a device, e.g. a radio device 2 or a network node 3 as discussed herein, to perform an embodiment of a method of the present disclosure. The computer program/computer-executable components may be run on the processor circuitry 21/31 of the device 2/3 for causing it to perform the method. The computer program product 40 may e.g. be comprised in a storage unit or memory 22/32 comprised in the device 2/3 and associated with the processor circuitry 21/31. Alternatively, the computer program product 40 may be, or be part of, a separate, e.g. mobile, storage means, such as a computer readable disc, e.g. CD or DVD or hard disc/drive, or a solid state storage medium, e.g. a RAM or Flash memory.

According to an aspect of the present disclosure, there is provided a computer program 43 comprising computer program code which is able to, when run on processor circuitry 31 of a node 3 of a communication network 1, cause the node to obtain a prediction of future available bandwidth of a radio carrier for a service application 24 in a radio device 2 connected to said network. The code is also able to cause the node to receive information about a status of an application buffer of the service application. The code is also able to cause the node to, based on the obtained prediction and on the received buffer information, prepare a recommendation to the service application for when to fill up its application buffer. The code is also able to cause the node to initiate sending a recommendation message comprising the prepared recommendation to the radio device.

According to another aspect of the present disclosure, there is provided a computer program 41 comprising computer program code which is able to, when run on processor circuitry 21 of a radio device 2, cause the radio device to run a service application 24 having an application buffer. The code is also able to cause the radio device to send information about a status of the application buffer to a communication network 1. The code is also able to cause the radio device to receive, from the communication network, a recommendation message comprising a recommendation for when to fill up the application buffer. The code is also able to cause the radio device to determine, based on the received recommendation, a time period during which it will fill up the application buffer. The code is also able to cause the radio device to send a request to a service provider of the service application for downloading data to the application buffer during the determined time period.

According to another aspect of the present disclosure, there is provided a computer program product 40 comprising an embodiment of a computer program 41 and/or 43 of the present disclosure and a computer readable means 42 on which the computer program is stored.

Figure 5:
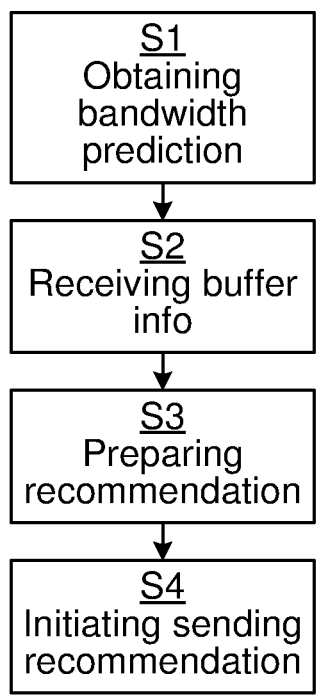
FIG. 5 is a schematic flow chart of an embodiment of a method performed in a communication network, of the present disclosure.

FIG. 5 is a schematic flow chart of an embodiment of a method performed in the communication network 1, e.g. in a network node 3 such as an eNB, a Node B or a Radio Network Controller (RNC).

A prediction of future available bandwidth of a radio carrier 8 is obtained S1 for a service application 24 in a radio device 2 connected to the communication network. That the prediction is obtained may imply that the network node 3 which performs the method of FIG. 5 makes the prediction, or that the network node 3 receives information about the prediction originating from elsewhere (e.g. from a machine learning function), e.g. from another node in the communication network or from the radio device 2. A function for making the prediction may thus be located in the communication network 1, e.g. co-located with an eNB or RNC in the RAN 4, or outside of the communication network 1 e.g. as a cloud function. The available bandwidth (downlink throughput) may be predicted based on, e.g., the predicted cell load in the cell of the communication network which the radio device is connected to. The cell load may be predicted based on how much data for transmission to cell connected radio device(s) is held in buffers in the network (e.g. the base station providing the cell), and on the scheduling for transmission of said data. Additionally or alternatively, the prediction may be based on the quality of the radio connection between the radio device 2 and the base station 3. If, e.g., the radio device is moving away from the base station, the available bandwidth may be predicted to decrease, while if the radio device is moving towards the base station, the bandwidth may be predicted to increase.

Before, after or in parallel with obtaining S1 the prediction, information about a status of an application buffer of the service application is received S2. The radio device 2, e.g. the service application 24 in the radio device, may send information about its application buffer to the network 1 (for instance to the node 3). More specifically, the status information may comprise information about how much data is buffered for the service in the application buffer. If the service is for media streaming, the status information may comprise information about for how long streaming time the buffered data will last (e.g., the amount of media data currently buffered in the application buffer will last for providing the media streaming service for a specified amount of seconds before the streaming is interrupted unless the buffer has been replenished). The status information may thus inform the network 1 about whether the radio device needs to download data to the application buffer now or whether it could wait for a time without interrupting the service.

Based on the obtained S1 prediction and on the received S2 buffer information, a recommendation to the service application 24 for when to fill up the application buffer of the service application is prepared S3. The network 1, e.g., a node 3 in the network may use a predetermined algorithm, calculate or otherwise deduce when it will be advantageous (to the service application 24 as well as the network) for the radio device 2 to download data (e.g., media segments of a streaming media service) to the application buffer. Since it generally consumes less resources to download data when the bandwidth is abundant than when it is limited, it is advantageous to suggest the radio device to primarily download the data when there is much available bandwidth rather than when the bandwidth is more limited, provided that the buffer status allows the radio device to hold off from downloading without interrupting the service due to an empty application buffer. In some embodiments, the recommendation may have been requested by the service application 24. One alternative is that the service application sends buffer status information regularly and the network node 3 initiates a recommendation when needed, e.g. wait download until further notice, download now, etc. Another alternative is that the service application 24 requests download information and the network node replies.

Then, sending of a recommendation message comprising the prepared S3 recommendation to the radio device 2 is initiated. If the method is performed by the serving RAN node 3, the node can send the recommendation message to the radio device 2 over a radio interface. Otherwise, the node performing the method may provide information allowing the serving RAN node to send the recommendation message. By providing the recommendation message to the radio device 2, the radio device, e.g. the service application 24, may consider the recommendation when deciding when (at which time points) to schedule request for data segments from the SP 7.

Figure 6:
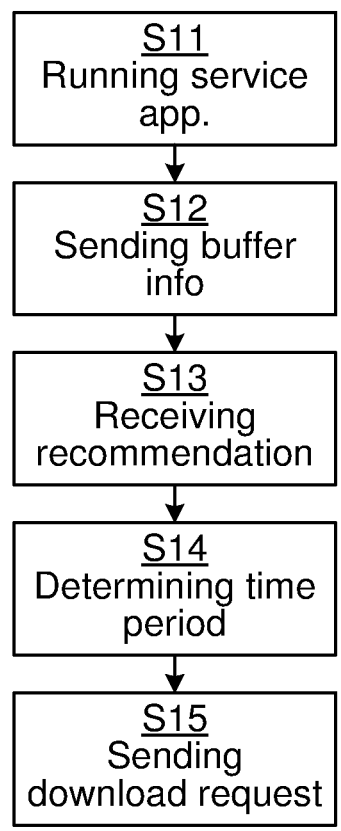
FIG. 6 is a schematic flow chart of an embodiment of a method performed in a radio device, of the present disclosure.

FIG. 6 is a schematic flow chart of an embodiment of a method performed in the radio device 2. The method may correspond to the method of FIG. 5 relating to the network side. The discussion in relation to FIG. 5 is thus in applicable parts also relevant to the method of FIG. 6.

The radio device 2 runs S11 the service application 24, which service application has an application buffer. This implies that application SW 44 is executed by the processor circuitry 21 to form the service application 24.

While running S11 the service application, the radio device 2 sends S12 information about a status of the application buffer to the communication network. The radio device may obtain the status information by means of the service application 24 and then send it over the radio communication interface 23. The status information may be sent to any node in the communication network, e.g. to a RAN node 3. The information may then be sent in a message addressed to the RAN 4 with a RAN IP address on a radio bearer. Even though a bearer (e.g. an Evolved Packet System (EPS) bearer) may be set up between the radio device 2 and the CN 6 (the bearer may e.g. terminate in a PDN Gateway, PGW) and only passes via the RAN 4, a RAN node 3 may listen (perform "sniffing") for the RAN IP address which would allow the RAN node to intercept the message addressed to the RAN, comprising the status information, and removing it from the bearer.

In response to the sent S12 status information, the radio device receives S13, from the communication network 1, the recommendation message comprising a recommendation for when to fill up the application buffer. The service application 24 may consider this recommendation when scheduling requests for service data from the SP 7, by means of the scheduler 25.

Thus, the radio device 2, typically by means of the service application 24, determines S14, based on the received S13 recommendation, a time period during which it will fill up the application buffer. The service application 24 may choose to schedule download of service data during a time period, and choose not to schedule download of service data during another time period, depending on the received S13 recommendation.

Then, the radio device 2 sends S15 a request to the service provider 7 of the service application 24 for downloading data to the application buffer during the determined S14 time period.

Generally, the RAN 4 may decide which radio device 2 service application 24 that is in turn to fill its buffer (e.g. on which dedicated bearer), based on application buffer status and radio conditions. It is noted that the RAN 4 may serve any number of radio devices 2, typically more than one radio device 2. The radio device 2 informs the RAN 4 about its buffer status and the RAN tells the radio device when it is more optimal to request new content. This makes it possible for the network 1 to steer the radio device to download more during good radio conditions and avoid downloading at congestion. A benefit of this approach, i.e. having this functionality on the network side, instead of the radio device side, is that the network schedules the downlink and may steer the scheduler behaviour and that the network has knowledge about any other service users.

Radio device mobility predictions and cell load predictions may make it possible to anticipate coverage holes and handover situations and possibly also congestion situations and lower load possibilities, and thereby related upcoming drops in radio device downlink throughput as well as upcoming throughput peaks. This information together with information from the radio device about the status of the, e.g., media play out buffer may be used by the RAN to trigger the radio device to download content when the throughput is good, before running out of coverage, or to hold the download until better conditions approaches, improving both end user quality and RAN efficiency.

By means of embodiments of the present disclosure, download of media content to radio devices 2 may be adapted to current and near-future radio conditions and load, and not to the past radio conditions and load. Also upload of media content to the SP 7 server may be adapted in the same way. This may give both increased end user quality and increased RAN efficiency as the downloading/uploading is steered towards low load and good radio conditions. Also, actions for specific radio device(s) based on the size of the its application buffer may be taken to avoid e.g. video stalling at bad radio conditions or load peaks in the serving cell, which leads to an increased end user experience.

In some embodiments of the present disclosure, the buffer status information indicates that the application buffer is filled above a predefined threshold. Then, the recommendation may comprise a recommendation to wait with filling up the application buffer.

In some embodiments of the present disclosure, the future available bandwidth is predicted to improve. In that case, the recommendation may comprise a recommendation to wait with filling up the application buffer, especially if the buffer status is not such that the buffer needs to be replenished urgently.

Specifically, if both the buffer status information indicates that the application buffer is filled above a predefined threshold and the future available bandwidth is predicted to improve, the recommendation may comprise a recommendation to wait with filling up the application buffer.

In some embodiments, the recommendation to wait with filling up the application buffer may comprise a recommendation to wait a specified time period. The buffer information may e.g. have indicated that the status of the buffer is such that the buffer contains data enough for providing the service during the specified time period without having to replenish the buffer.

In some embodiments of the present disclosure, the recommendation comprises a recommendation to fill up the application buffer above a specified threshold. The threshold may be such that the buffer holds data enough for being able to provide the service for a certain amount of time if e.g. an upcoming time period (having a length to which said certain amount of time is adapted) is predicted to be unfavourable for downloading data to the buffer.

EXAMPLES

Machine learning methods and pattern recognition techniques makes it possible to foresee future drops in throughput to the radio device 2 related to the movement of the radio device towards another cell in the RAN 4, e.g. handover (HO), or around a corner. It is also possible to predict variations in serving cell load and impending congestion situations.

Information about the expected throughput variations together with the knowledge of the radio device application buffer status makes it possible to deduce when it is more favourable to download for a specific radio device 2 and especially when it is of utmost importance to download in order not to experience critical buffer levels. It is also possible to point out the periods when download is not recommended due to low throughput.

Whether to download or not at a specific point in time may be decided by using information about the buffer status and the predicted throughput. If the service may survive a temporary drop in throughput, e.g. due to lack of coverage, the radio device may be asked not to download until better throughput is available. In another situation, the radio device may be asked to fill up its buffer in advance before the throughput goes down due to bad coverage or an upcoming handover.

Example of basic download rule:
Predicted high throughput -> download as much as the application buffer allows
Predicted low throughput and buffer status above a predefined threshold -> hold the download until better conditions are available
Predicted low throughput and low buffer status -> quickly download enough content to survive the upcoming low throughput/outage, possibly also with decreased media rate Based on a number of predictions, the most favourable download opportunity may be deduced. The decision to download is based on the predictions and e.g. the application buffer status. Predictions are continuously repeated, e.g. with a sliding window approach.

Figure 7:
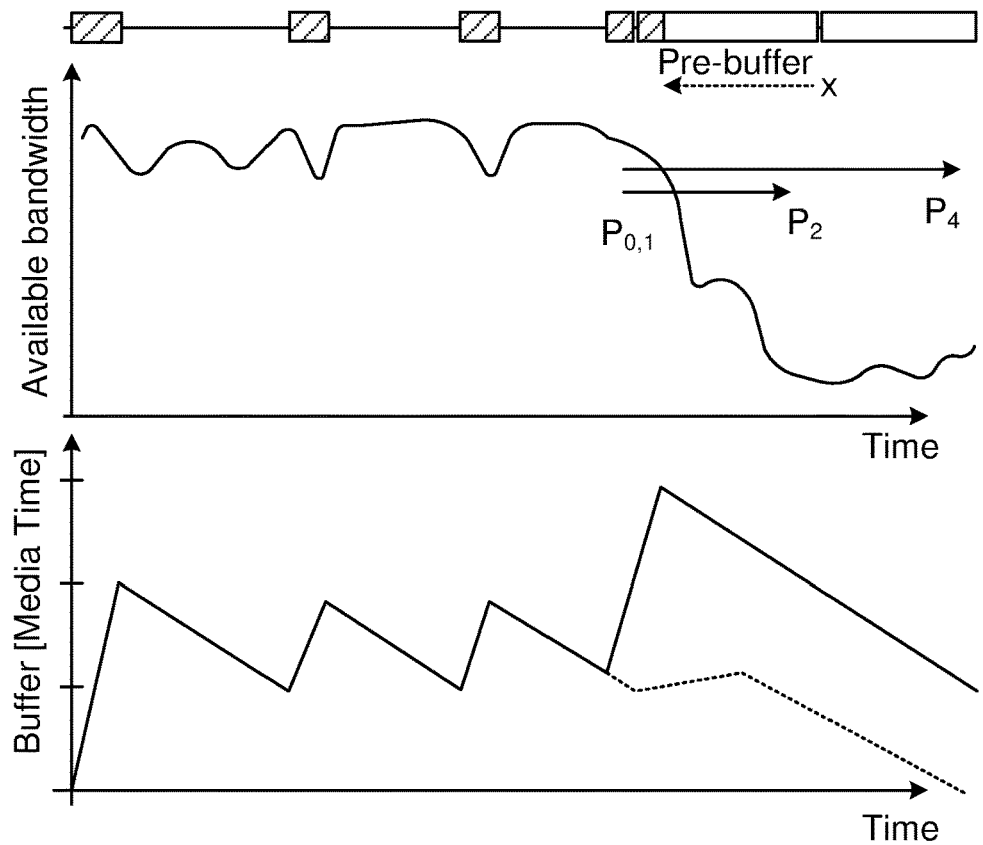
FIG. 7 is a schematic graph over available bandwidth and application buffer status of a service application in a radio device according to an example embodiment of the present disclosure.
Figure 8:
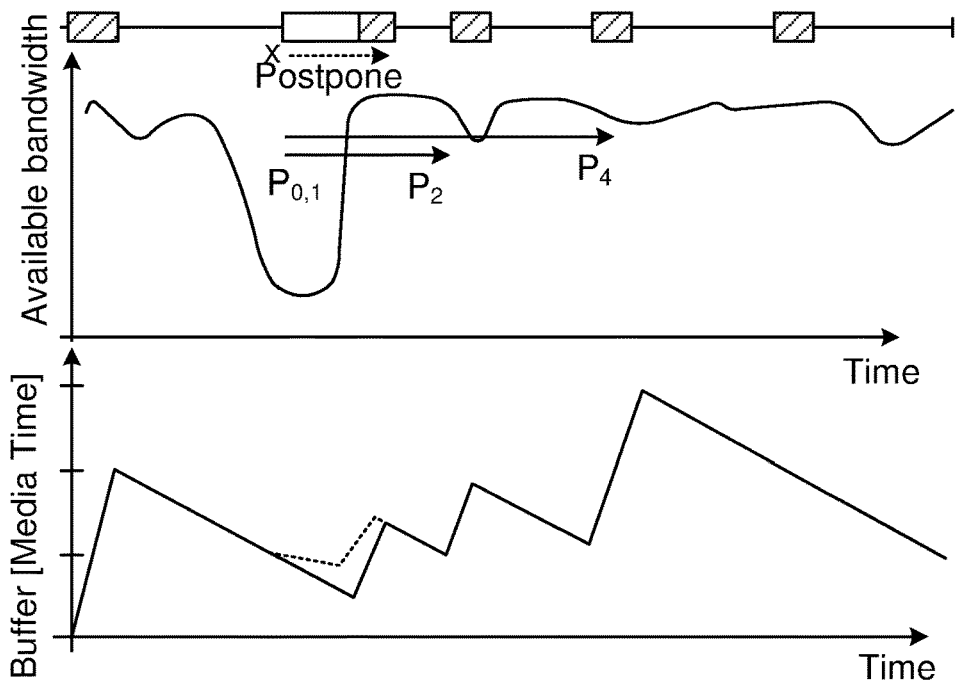
FIG. 8 is a schematic graph over available bandwidth and application buffer status of a service application in a radio device according to another example embodiment of the present disclosure.

The algorithm may look as in FIGS. 7 and 8, where Px is the average predicted throughput for e.g. three upcoming periods 0.1, 2 and 4, corresponding to 100 ms, 2 s, 4 s. FIG. 7 relates to a situation with pre-buffering. P is the predicted average throughput for different time intervals. Based on predicted values for the different time intervals, the decision to pre-buffer more content is taken (the dotted line shows how it works according to prior art and the full line shows how it will work in accordance with the present disclosure.) The service play out will survive through bad radio conditions. FIG. 8 relates to a situation with postponement. P is the predicted average throughput for different time intervals. Based on predicted values for the different time intervals, the decision to postpone download of content until more bandwidth is available for the service application (the dotted line shows how it works according to prior art and the full line shows how it will work in accordance with the present disclosure). Fewer resources will be spent if transmission is postponed until more throughput is available.

The algorithm may be as generally set out below.
Postpone download of next segment if:
P0.1«P2
and if
Buffer status>postpone threshold
If the application buffer is filled above a threshold securing that there is enough content in the buffer to make the service play out survive e.g. more than 2 s and the throughput is predicted to increase dramatically, the download of the current video segment is postponed until the available throughput has increased, which in this case is predicted to be in a two seconds time frame.

If the throughput is predicted to be stable or slowly increasing, the download of media segments is following the normal pace indicated by the buffer status level.
Pre-buffer next segment if:
P0.1>P2
and if
Buffer status<pre-buffer threshold
In other words, download the next video segment if the available throughput is higher now than it will be in e.g. 2 seconds, i.e. if the throughput is predicted to decrease, and if the buffer status of the service application 24 is lower than a pre-buffer threshold. The pre-buffer threshold may be defined by the time it takes to empty the buffer in relation to when the next segment may be downloaded in order to avoid frozen video frames. If the buffer exceeds this threshold then it is ensured that the service play out will survive more than two seconds. The pre-buffer threshold is typically higher than the postpone threshold.

This procedure may be repeated for the coming N segments. If for example an upcoming handover with a longer throughput outage is predicted, several segments may be pre-buffered in order to survive the longer outage. Example procedure for the second next segment:
Pre-buffer second next segment if:
P2>P4 and P4<Required media rate
Pre-buffer also third next segment etc. for coming N segments until end of throughput outage, if:
P0.1>P2>P4≥P5 and P4 & P5<Required media rate
When the throughput is predicted to be higher the coming two seconds than more far away in the future, and the future throughput is predicted to be lower than the actual media rate, service play out rate, the media should be downloaded in advance also for the coming segments in order to survive the anticipated drop in throughput without risking to stall the video.
Initiate decrease of media rate if:
P1×t2<media rate×t2−buffer
When the available throughput is low and stalling of the video content cannot be avoided with pre buffering the media rate has to be decreased to make the video session survive the temporary throughput outage. That means to initiate decrease of media rate if the application buffer will be emptied faster than the maximum achievable download rate, faster than the buffer may be filled which means that the video risk to be stalled.

The functionality may be enhanced by also considering the length of a predicted throughput outage and also the length of a predicted peak in throughput. Network capacity is wasted today by the service application downloading and filling the buffer with media of a low play out rate at bad conditions and then when conditions improves, the previously downloaded low rate media is just thrown away and the buffer is refilled with high quality media (high play out rate). It would be much more efficient if the download was put on hold while the throughput (i.e. bandwidth) was low and then continued with the higher quality media as soon as possible, i.e. if the better conditions could be predicted with enough certainty. This means that instead of, as indicated above, predict the average throughput from time 0 to time 4, the throughput should be predicted from time 0 to time 2 and from time 2 to time 4 and from time 4 to time 6 etc. The time intervals may of course be of any size. The throughput predictions could, as indicated above, be updated continuously by a sliding window procedure, where the prediction updating intervals may be much smaller than the length of the time interval over which the predictions are done, e.g. 100 ms instead of seconds.

The download rules may also be combined with actions on content adaptation, for example if a severe drop in throughput is predicted the content may already in advance be adapted to a lower play out rate in order to make it possible to download as much as possible of the media before the throughput drops and thereby smoothen the impact of lower throughput on the end user experience.

Figure 9:
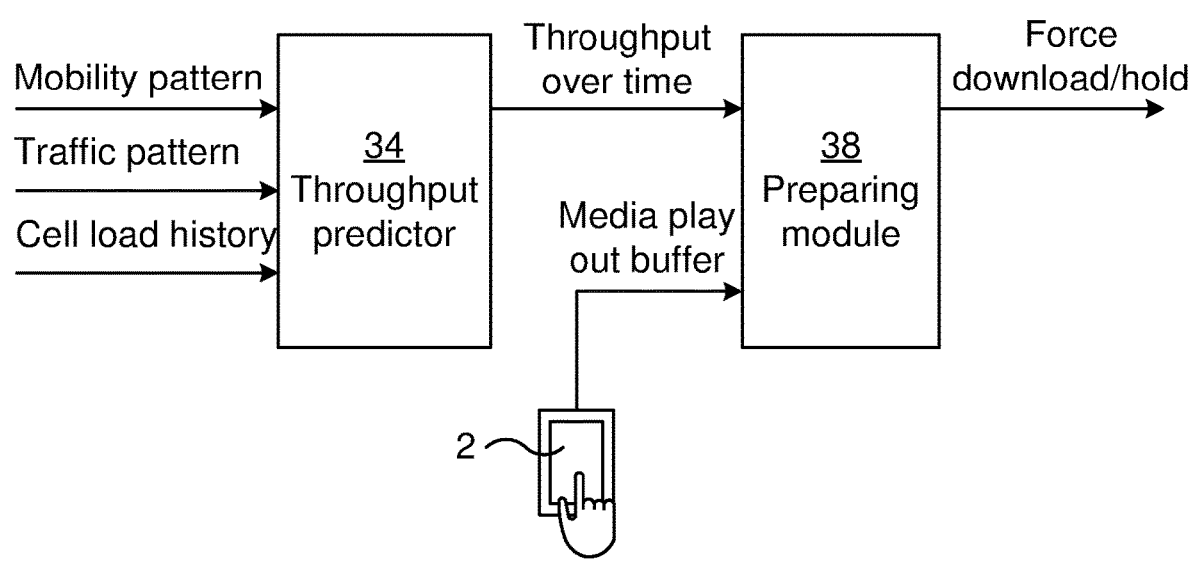
FIG. 9 is a schematic block diagram illustrating example embodiments of the present disclosure.

With reference to FIG. 9, the throughput predictor 34 may predict, by statistical analysis of historical data, the throughput for each radio device 2 (e.g. each radio device connected to a RAN node 3) in a near future, e.g. a couple of seconds, and over longer time intervals, e.g. 10 s. The predicted throughput together with the knowledge of the application media play out buffer in the radio device may then be used by the preparing module 38 to find out when it is most favourable for the radio device to download content data or a chunk of content data.

The throughput predictor 34 may also foresee important throughput drops due to handovers and the like. The preparing module 38 takes the application media play out buffer into account and based on the possibility for the media play out to survive a temporary hold in the incoming media (decided by the size of the application buffer) alternatively the possibility for the radio device 2 to quickly fill the buffer before the throughput drop, a decision is taken on whether to force the download (pre-buffer one or several segments) or to temporary hold the download (postpone the download until throughput increases).

The input traffic pattern typically comprises of the uplink and downlink history of inter arrival times, media segment sizes and the time to download each chunk for a specific radio device 2.

The mobility pattern may consist of the history of signal strengths and signal to interference ratios for a specific radio device, uplink and downlink. It may also consider HO history.

For further enhancements it is also possible to include information about recently dropped packets and retransmission rates etc.

The cell load history may contain load variations over time and resource utilization as well as the number of connected subscribers and the total throughput and the average throughput per service subscriber in the serving cell.

The throughput over time prediction is, in its simplest form, just an indication of the average throughput over a specific time frame, e.g. from now and a few seconds ahead in time. It may also include variations in throughput, such as the throughput derivative indicating a continuously decrease or increase in throughput telling the importance of downloading fast or wait and adapting the content or not. Another alternative for the Throughput over time is the length of a temporary throughput outage, for example at an impending hand over.

Below follow a couple of other aspects of the present disclosure.

According to an aspect of the present disclosure, there is provided a node 3 for a communication network 1. The node comprises means (e.g. the prediction module 36 and/or the predictor 34) for obtaining S1 a prediction of future available bandwidth of a radio carrier 8 for a service application 24 in a radio device 2 connected to said network. The node 3 also comprises means (e.g. the receiving module 37 and/or the communication interface 33) for receiving S2 information about a status of an application buffer of the service application. The node 3 also comprises means (e.g. the preparing module 38) for, based on the obtained S1 prediction and on the received S2 buffer information, preparing S3 a recommendation to the service application for when to fill up an application buffer of the service application. The node 3 also comprises means (e.g. the sending module 39 and/or the communication interface 33) for initiating S4 sending of a recommendation message comprising the prepared S3 recommendation to the radio device 2.

According to another aspect of the present disclosure, there is provided a radio device 2 for communication via a communication network 1. The radio device comprises means (e.g. the application running module 26) for running S11 a service application 24 having an application buffer. The radio device also comprises means (e.g. the sending module 27 and/or the radio communication interface 23) for sending S12 information about a status of the application buffer to the communication network 1. The radio device also comprises means (e.g. the receiving module 28 and/or the radio communication interface 23) for receiving S13, from the communication network 1, a recommendation message comprising a recommendation for when to fill up the application buffer. The radio device 2 also comprises means (e.g. the determining module 29 and/or the scheduler 25) for determining S14, based on the received S13 recommendation, a time period during which it will fill up the application buffer. The radio device also comprises means (e.g. the sending module 27 and/or the radio communication interface 23) for sending S15 a request to a service provider 7 of the service application 24 for downloading data to the application buffer during the determined S14 time period.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method performed in a communication network, the method comprising:
   obtaining a prediction of future available bandwidth of a radio carrier for a service application in a radio device connected to said communication network, wherein the prediction of the future available bandwidth is for each of a number of upcoming time intervals;
   receiving buffer information about a fill status of an application buffer of the service application;

based on the obtained prediction and on the received buffer information, preparing a recommendation to the service application by recommending a time interval, of the upcoming time intervals, with sufficient predicted available bandwidth for the service application to download data to fill up the application buffer of the service application, the recommended time interval selected so as not to deplete the application buffer; and initiating sending of a recommendation message comprising the recommendation to the radio device, in order to cause the service application to download the data within the recommended time interval.

2. The method of claim 1, wherein the recommendation is to wait with filling up the application buffer, when the application buffer is filled above a predefined threshold.

3. The method of claim 1, wherein the recommendation comprises a recommendation to fill up the application buffer above a specified threshold.

4. The method of claim 1, wherein the service application is for streaming media.

5. The method of claim 1, wherein the method is performed in a Radio Access Network (RAN) node of the communication network.

6. A node for a communication network, the node comprising:
processor circuitry; and
a storage unit storing instructions executable by said processor circuitry, wherein the instructions which, when executed by the processor circuitry, cause said node to perform operations to:
obtain a prediction of future available bandwidth of a radio carrier for a service application in a radio device connected to said communication network, wherein the prediction of the future available bandwidth is for each of a number of upcoming time intervals;
receive buffer information about a fill status of an application buffer of the service application;
based on the obtained prediction and on the received buffer information, prepare a recommendation to the service application by recommending a time interval, of the upcoming time intervals, with sufficient predicted available bandwidth for the service application to download data to fill up the application buffer of the service application, the recommended time interval selected so as not to deplete the application buffer; and
initiate sending of a recommendation message comprising the recommendation to the radio device, in order to cause the service application to download the data within the recommended time interval.

7. A method performed in a radio device connected to a communication network, the method comprising:
running a service application having an application buffer;
sending buffer information about a fill status of the application buffer to the communication network;
receiving, from the communication network, a recommendation message comprising a recommendation for when to fill up the application buffer, wherein the communication network determined the recommendation based on obtaining a prediction of future available bandwidth of a radio carrier for the service application, wherein the prediction of the future available bandwidth is for each of a number of upcoming time intervals and, based on the obtained prediction and on the buffer information, prepared the recommendation to the service application by recommending a time interval, of the upcoming time intervals, with sufficient predicted available bandwidth for the service application to download data to fill up the application buffer of the service application, the recommended time interval selected so as not to deplete the application buffer;
determining, based on the received recommendation, a time period to fill up the application buffer; and
sending a request to a service provider of the service application for downloading the data to the application buffer during the time period, in order to cause the download of the data to the radio device.

8. The method of claim 7, wherein the recommendation is to wait with filling up the application buffer, when the application buffer is filled above a predefined threshold.

9. A radio device for communication via a communication network, the radio device comprising:
processor circuitry; and
a storage unit storing instructions executable by said processor circuitry, wherein the instructions which, when executed by the processor circuitry, cause said radio device to perform operations to:
run a service application having an application buffer;
send buffer information about a fill status of the application buffer to the communication network;
receive, from the communication network, a recommendation message comprising a recommendation for when to fill up the application buffer, wherein the communication network determined the recommendation based on obtaining a prediction of future available bandwidth of a radio carrier for the service application, wherein the prediction of the future available bandwidth is for each of a number of upcoming time intervals and, based on the obtained prediction and on the buffer information, prepared the recommendation to the service application by recommending a time interval, of the upcoming time intervals, with sufficient predicted available bandwidth for the service application to download data to fill up the application buffer of the service application, the recommended time interval selected so as not to deplete the application buffer;
determine, based on the received recommendation, a time period to fill up the application buffer; and
send a request to a service provider of the service application for downloading the data to the application buffer during the time period, in order to cause the download of the data to the radio device.

10. A non-transitory computer readable storage medium having stored thereon computer program code which, when run on processor circuitry of a node of a communication network, cause the node to perform operations comprising:
obtaining a prediction of future available bandwidth of a radio carrier for a service application in a radio device connected to said communication network, wherein the prediction of the future available bandwidth is for each of a number of upcoming time intervals;
receiving buffer information about a fill status of an application buffer of the service application;
based on the obtained prediction and on the received buffer information, preparing a recommendation to the service application by recommending a time interval, of the upcoming time intervals, with sufficient predicted available bandwidth for the service application to download data to fill up the application buffer of the service application, the recommended time interval selected so as not to deplete the application buffer; and initiating sending a recommendation message comprising the prepared recommendation to the radio device, in order to cause the service application to download the data within the recommended time interval.

11. A non-transitory computer readable storage medium having stored thereon computer program code which, when run on processor circuitry of a radio device that communicates via a communication network, cause the radio device to perform operations comprising:

running a service application having an application buffer;

sending buffer information about a fill status of the application buffer to the communication network;

receiving, from the communication network, a recommendation message comprising a recommendation for when to fill up the application buffer, wherein the communication network determined the recommendation based on obtaining a prediction of future available bandwidth of a radio carrier for the service application, wherein the prediction of the future available bandwidth is for each of a number of upcoming time intervals and, based on the obtained prediction and on the buffer information, prepared the recommendation to the service application by recommending a time interval, of the upcoming time intervals, with sufficient predicted available bandwidth for the service application to download data to fill up the application buffer of the service application, the recommended time interval selected so as not to deplete the application buffer;

determining, based on the received recommendation, a time period to fill up the application buffer; and sending a request to a service provider of the service application for downloading the data to the application buffer during the time period, in order to cause the download of the data to the radio device.

\* \* \* \* \*